(12) United States Patent
Wangerow et al.

(10) Patent No.: US 6,932,958 B2
(45) Date of Patent: Aug. 23, 2005

(54) SIMPLIFIED THREE-STAGE FUEL PROCESSOR

(75) Inventors: James R. Wangerow, Lemont, IL (US);
Alvie R. Meadows, Elmhurst, IL (US);
Andy H. Hill, Glen Ellyn, IL (US);
Michael Onischak, St. Charles, IL (US)

(73) Assignee: Gas Technology Institute, Des Plaines, IL (US)

( * ) Notice: Subject to any disclaimer, the term of this patent is extended or adjusted under 35 U.S.C. 154(b) by 331 days.

(21) Appl. No.: 10/400,034

(22) Filed: Mar. 26, 2003

(65) Prior Publication Data

US 2004/0187386 A1 Sep. 30, 2004

(51) Int. Cl.[7] .............................................. C01B 3/26
(52) U.S. Cl. ...................... 423/652; 48/61; 48/62 R; 48/89; 48/119; 48/127.9; 48/128; 48/198.3; 48/198.7; 252/373; 422/188; 422/198; 422/211; 423/655; 423/656
(58) Field of Search ........................... 48/61, 62 R, 89, 48/119, 127.9, 128, 198.3, 198.7; 252/373; 422/188–191, 198, 211; 423/650, 651, 652, 655, 656

(56) References Cited

U.S. PATENT DOCUMENTS 5,997,594 A  * 12/1999  Edlund et al. ................. 48/76

* cited by examiner

Primary Examiner—Stanley S. Silverman
Assistant Examiner—Maribel Medina
(74) Attorney, Agent, or Firm—Mark E. Fejer

(57) ABSTRACT

A fuel processor for producing a hydrogen-rich product gas suitable for direct use in fuel cell applications includes a housing, an annular shift/methanator reactor vessel at least one reactor vessel wall disposed within the housing and forming an outer annular space between the at least one reactor vessel wall and the housing. A combustion chamber having at least one combustion chamber wall and forming a first inner annular space between the at least one combustion chamber wall and the at least one reactor vessel wall is disposed in the interior space formed by the annular shift/methanator reactor vessel, and a reformer reactor vessel having at least one reformer vessel wall and forming a second inner annular space between the at least one reformer vessel wall and the at least one combustion chamber wall is disposed within the combustion chamber.

29 Claims, 4 Drawing Sheets

Low Space Velocity Conditions

Higher Space Velocity Conditions

SIMPLIFIED THREE-STAGE FUEL PROCESSOR

BACKGROUND OF THE INVENTION

This invention relates to a fuel processor and method for reforming natural gas and other hydrocarbon fuels to produce a reformed fuel suitable for direct use in an electrochemical fuel cell. More particularly, this invention relates to a fuel processor and method whereby natural gas or other hydrocarbon fuels are first subjected to the well-known reforming reactions in which the fuel is reacted with steam, resulting in the formation of a reformer effluent comprising hydrogen, carbon dioxide and a substantial amount of carbon monoxide. To reduce the amount of carbon monoxide, the reformer effluent is subjected to a shift reaction in which the carbon monoxide reacts with steam to provide carbon dioxide and additional hydrogen. Although the shift reaction substantially reduces the carbon monoxide present in the effluent, it is still too high for use in fuel cells such as polymer electrolyte membrane (PEM) fuel cells. Subsequent methanation in accordance with the method of this invention results in a mixture of gases comprising hydrogen, carbon dioxide and gaseous water, but little or no carbon monoxide. The hydrogen recovered from the mixture is of sufficient purity to enable its use in a PEM fuel cell. The fuel processor of this invention can also be used to supply hydrogen for a hydrogen refueling station.

Developers worldwide are currently working on numerous schemes for converting fuels. Within the fuel processor, much work has been focused on carbon monoxide control using selective catalysts that preferentially oxidize the carbon monoxide in the hydrogen-rich processed gas. However, for several reasons, this method is less than ideal. Firstly, the catalysts employed by such schemes are not 100% carbon monoxide selective. Secondly, significant combustion heat is evolved from consuming both carbon monoxide and hydrogen gases, thereby requiring the use of two or three stages coupled with heat exchanger equipment and controls for metering air bleeding. Thirdly, the air has to be metered in proportion to the amount and duration of the carbon monoxide content. And, fourthly, these systems are expensive to build and there is at present no accurate, real-time carbon monoxide sensor suitable for use in this system, as a result of which, in transient states, excess hydrogen is combusted to assure all of the carbon monoxide is consumed.

SUMMARY OF THE INVENTION

Accordingly, it is one object of this invention to provide an inexpensive apparatus and method for removing or substantially reducing the quantity of carbon monoxide in a mixture of hydrogen, carbon dioxide and carbon monoxide resulting from the reforming of hydrocarbon fuels.

It is another object of this invention to provide an apparatus and method for reforming hydrocarbon fuels which renders the fuels usable in applications such as fuel cells without additional processing subsequent to reforming.

It is yet a further object of this invention to provide an apparatus and method which addresses the remaining issues associated with hydrocarbon reforming as set forth herein above.

These and other objects of this invention are addressed by a fuel processor structure comprising concentric reformer, shift and methanation reactor vessels in which reformer heating is provided by a natural gas combustor comprising a bed of combustion catalyst and a ceramic start-up burner plate and in which steam for the reformer is generated in coiled vaporizer tubes heated by convection and from infrared-radiation surfaces from the hot combustor flue gases. The reformer hydrocarbon fuel feed is down-flow through the reformer and countercurrent to the heating source provided by a combustion process producing a high temperature flue gas flow. The reformer bed preferably comprises alternating layers of larger and smaller catalyst particles to enhance reformer process gas mixing. In addition, the shift and methanation catalysts are combined into a single reactor vessel, thereby simplifying heat management and fabrication.

Tubing coils wrapped around the combustion zone between the combustion zone and shift/methanation vessel moderate product gas temperatures. Incoming process gas and water remove heat from the reformer process gas stream leaving the reformer vessel. The length of this coil and the amount of water determine the amount of cooling. Process water passing through the shift/methanation coils adsorbs heat from the combustion chamber and the process gas. This heat results in the incoming water producing hot water or saturated steam prior to entering the steam coil in the combustion chamber. This effect moderates temperatures vertically throughout the length of the shift/methanation catalyst bed and reduces the amount of backpressure required to process fuel. Pressure created during the water vaporization step required for the steam reforming process does not affect incoming reformer fuel. Hence, fuel pressure is maintained at a minimum, thereby saving the costs associated with pressurizing the incoming fuel to feed gas with incoming water.

In accordance with one embodiment of this invention, the fuel processor structure further comprises a cathode air and humidification section that produces a warm stream, in the range of about 100° F. to about 250° F., of humidified air, in the range of about 10% to about 90% relative humidity. Ambient air and water from a deionized water source are introduced together to a heat exchanger disposed proximate the flue gas exhaust of the fuel processor. The cathode humidified air is supplied as a feed gas stream to a PEM fuel cell. The rate of humidified air is proportional to the $H_2$ gas generated by the fuel processor. Little or no controls are required for producing this humidified air.

Additional elements of this invention include the use of counter-current gas flow patterns for the reformer process gas stream and combustion flue gas stream so as to maximize fuel conversion and, thus, increase efficiency. In addition, the reformer/combustion/shift/methanation coils work together balancing heat flow by gas flows and catalysts temperature requirements to function optimally. Finally, insulation provides structural integrity to the fuel processor. The insulation binds the fuel processing vessel components and tubing into a single integrated compact structure.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

The fuel processor of this invention is suitable for converting hydrocarbon-containing gaseous and liquid fuels, such as natural gas, naphtha and alcohols, to a hydrogen-rich synthesis gas. Such hydrogen-rich synthesis gas is suitable for use in fuel cells, such as PEM fuel cells, without additional processing for removal of carbon monoxide as is frequently required of synthesis gases produced in a conventional manner. The fuel processor can also be used, as previously indicated, to supply hydrogen for a hydrogen refueling station.

The fuel processor of this invention is comprised generally of a housing, partially filled with an insulating material which is used to contain and insulate the various components of the processor as discussed in more detail herein below. The fuel processor of this invention comprises four basic sections, a heat exchange section comprising a methanator cooling coil, a steam coil and a shift cooling coil, a hydrocarbon reformer section comprising a reformer reactor vessel and a pre-reformer and reformer catalyst, a reformer heating combustor section comprising a combustion catalyst bed, fuel/air distributor means, and a burner, and a carbon monoxide reduction section comprising a shift/methanation reactor vessel, at least one shift catalyst, at least one methanation catalyst and a gas distributor means.

Figure 1:
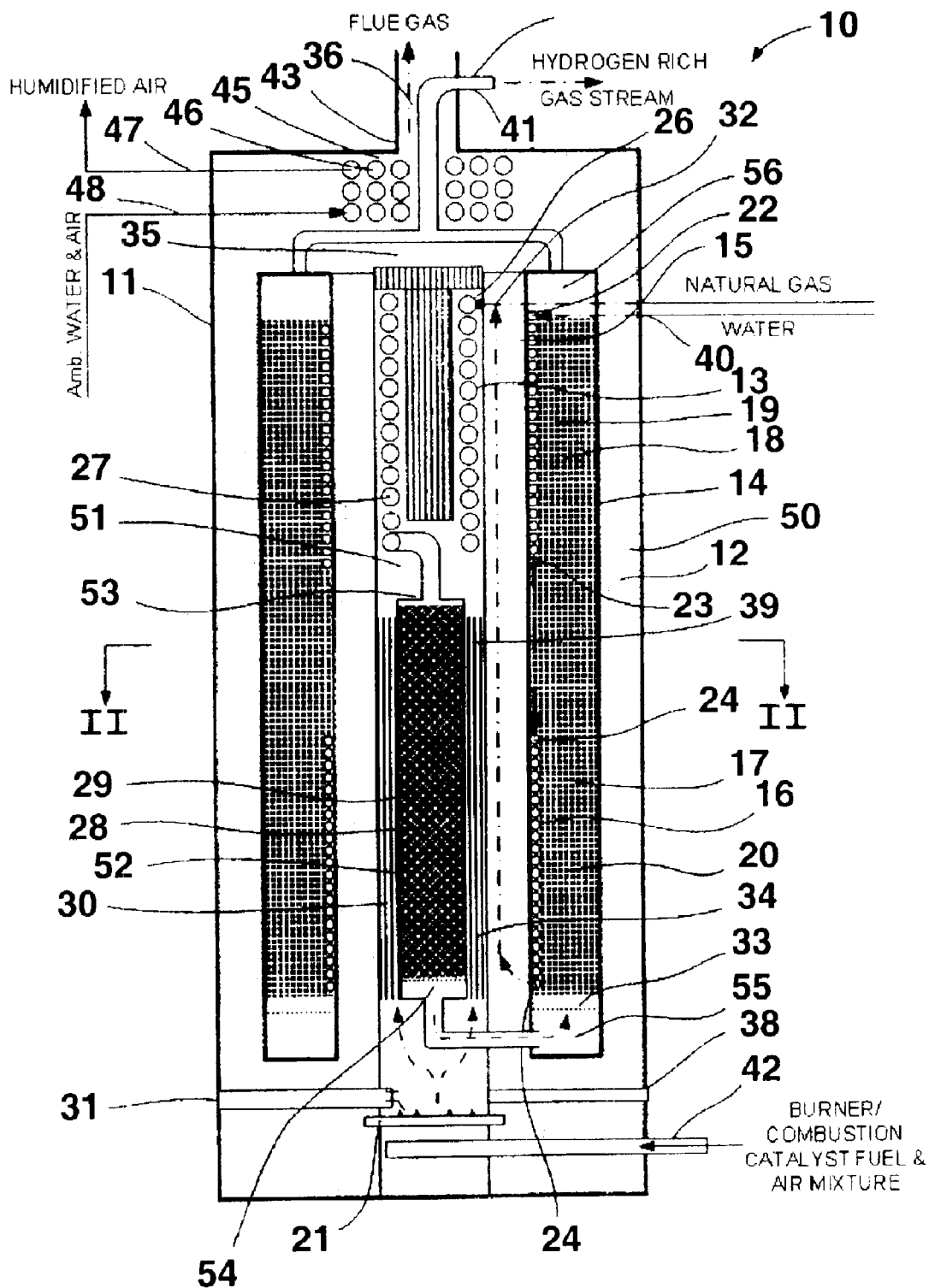
FIG. 1 is a cross-sectional view of a fuel processor in accordance with one embodiment of this invention.
Figure 2:
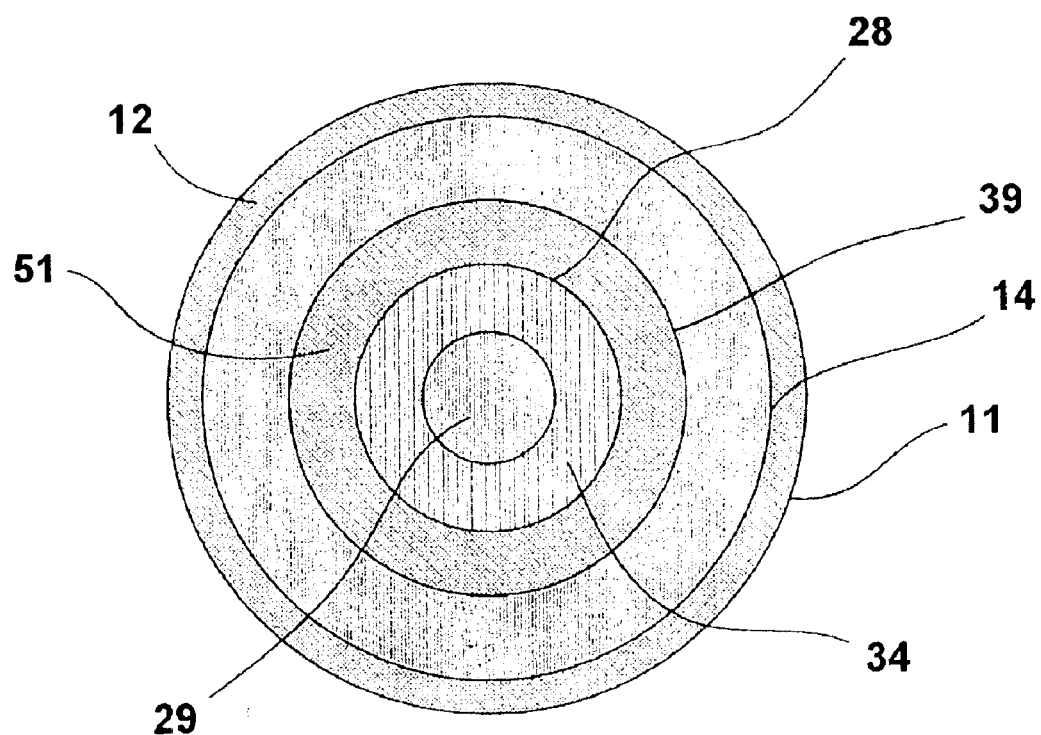
FIG. 2 is a view of the fuel processor shown in FIG. 1 taken along the line II—II.

More particularly, fuel processor 10 in accordance with one embodiment of this invention, as shown in FIGS. 1 and 2, comprises a housing 11 comprising at least one housing wall, which forms a reformable fuel and water inlet 40, a product gas outlet 41, a combustible fuel inlet 42 and a flue gas outlet 43. Housing 11 is preferably constructed of metal, although any suitable materials may be used. In accordance with one preferred embodiment, housing 11 is a cylindrical housing in which are disposed all of the major components of fuel processor 10.

Figure 4:
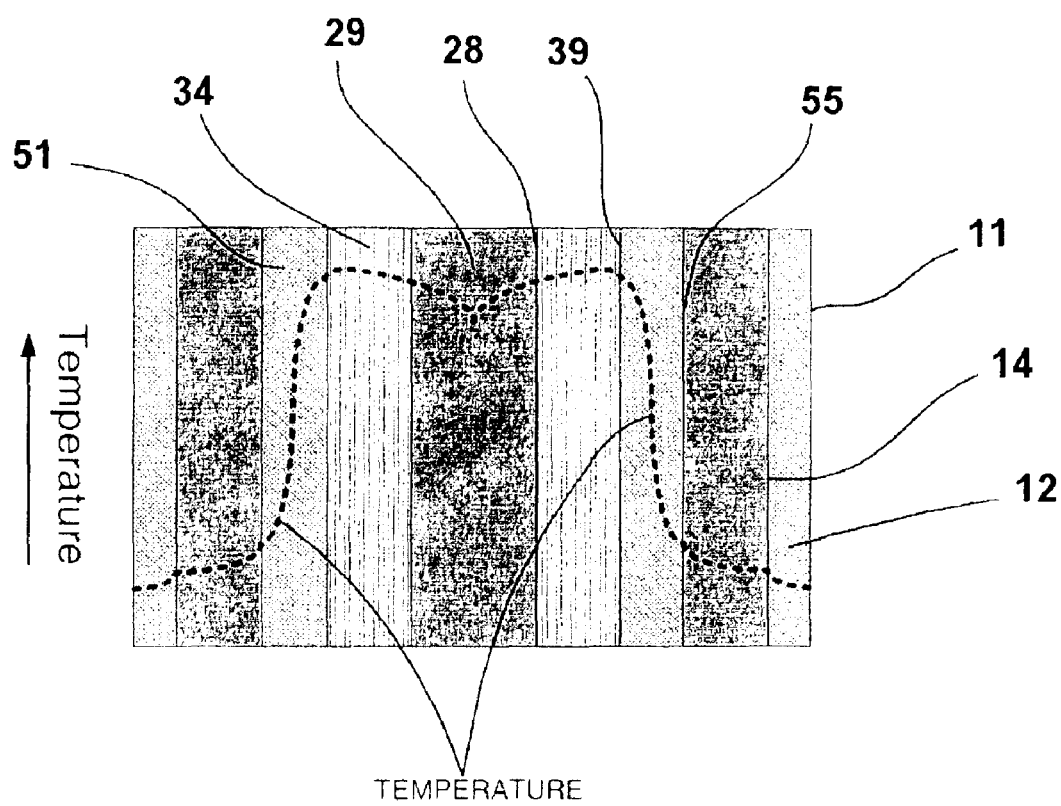
FIG. 4 is a diagram showing transverse heat flow patterns as temperature gradients taken along the line II—II of FIG. 1.

Disposed within housing 11 is a shift/methanator reactor vessel 14 comprising at least one reactor vessel wall, which reactor vessel wall together with the housing wall of housing 11 forms an outer annular space 50 between the reactor vessel wall and the housing wall. Shift/methanator reactor vessel 14 comprises a methanation zone 19 in which a methanation catalyst 18 is disposed and a shift zone 20 in which a shift catalyst 17 is disposed. Methanation zone 19 is disposed downstream of shift zone 20. The term "downstream" as used herein is based upon the direction of flow of the process stream through shift/methanator reactor vessel 14. Hydrogen-rich product gas is removed from fuel processor 10 through conduit 37, which is in fluid communication with methanation zone 19. Disposed within the outer annular space 50 is a suitable insulating material 12, which, in accordance with one preferred embodiment of this invention, is a castable refractory. Insulation between combustion zones and the shift/methanation vessel limits the amount of heat transferred to each section. Thickness, density and type of insulation determine the rate of heat transfer, thereby controlling the temperature inside each zone of the shift/methanation vessel. FIG. 4 shows a typical transverse heat flow pattern obtained during operation of the fuel processor of this invention. In accordance with another embodiment of this invention, the insulating material is a moldable ceramic insulating foam. In addition to providing insulation for the various components of fuel processor 10, the castable refractory may be used for structural containment of certain of the fuel processor components.

A combustion chamber 39 comprising at least one combustion chamber wall and forming a first inner annular space 51 between the at least one combustion chamber wall and the at least one reactor vessel wall is disposed within housing 11. Combustion chamber 39 comprises a combustion end 34 and a flue gas end 35. Combustion products produced in combustion chamber 39 are exhausted through flue gas exhaust 36. A combustible fuel introduced into fuel processor 10 through combustible fuel inlet 42 provides initial heat to raise the ambient temperature of the combustion catalyst to the fuel/air combustion mixture "light-off" or ignition temperature.

Disposed toward combustion end 34 of combustion chamber 39 is reformer reactor vessel 28 comprising at least one reformer vessel wall and forming a second inner annular space 52 between the at least one reformer vessel wall and the at least one combustion chamber wall. Reformer reactor vessel 28 is oriented such that the flow of fuel to be reformed is countercurrent to the flow of combustion products generated in combustion chamber 39 and exhausted through flue gas exhaust 36. In this way, the flow of fuel to the combustion chamber provides partial cooling of the reformer process gas. Disposed within at least a portion of the second inner annular space 51 is combustion catalyst bed 30.

Figure 3A:
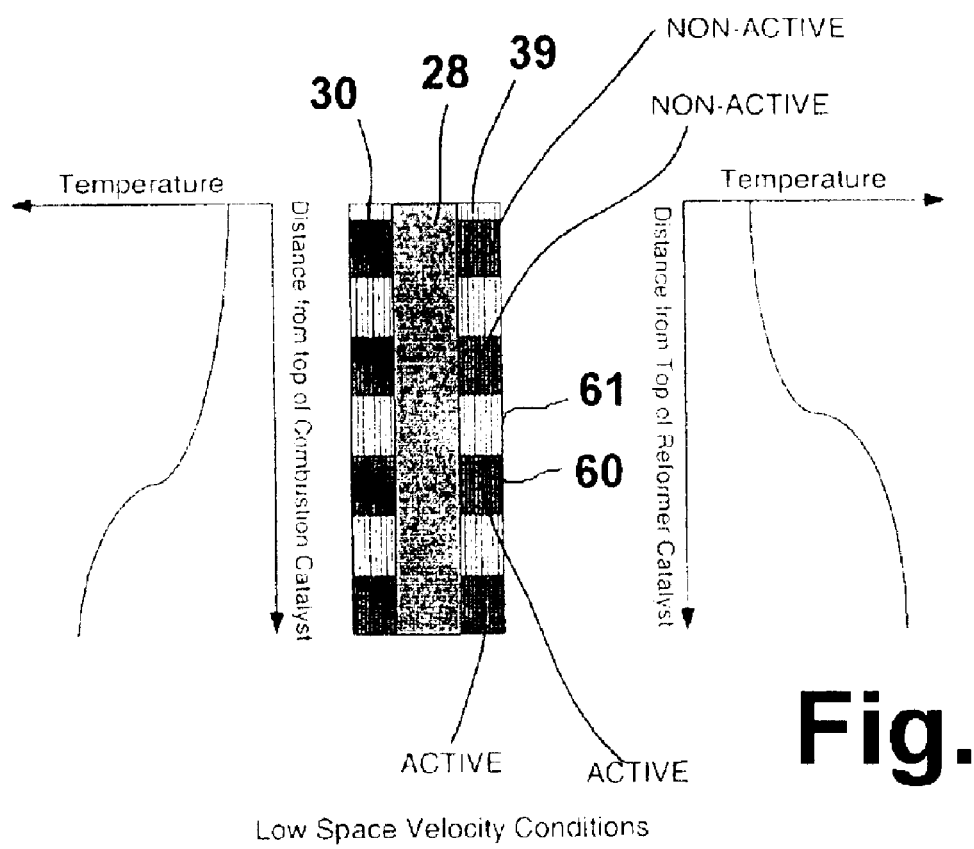
FIGS. 3A and 3B are diagrams showing heat flow patterns for low and high space velocity conditions in the fuel processor in accordance with one embodiment of this invention.
Figure 3B:
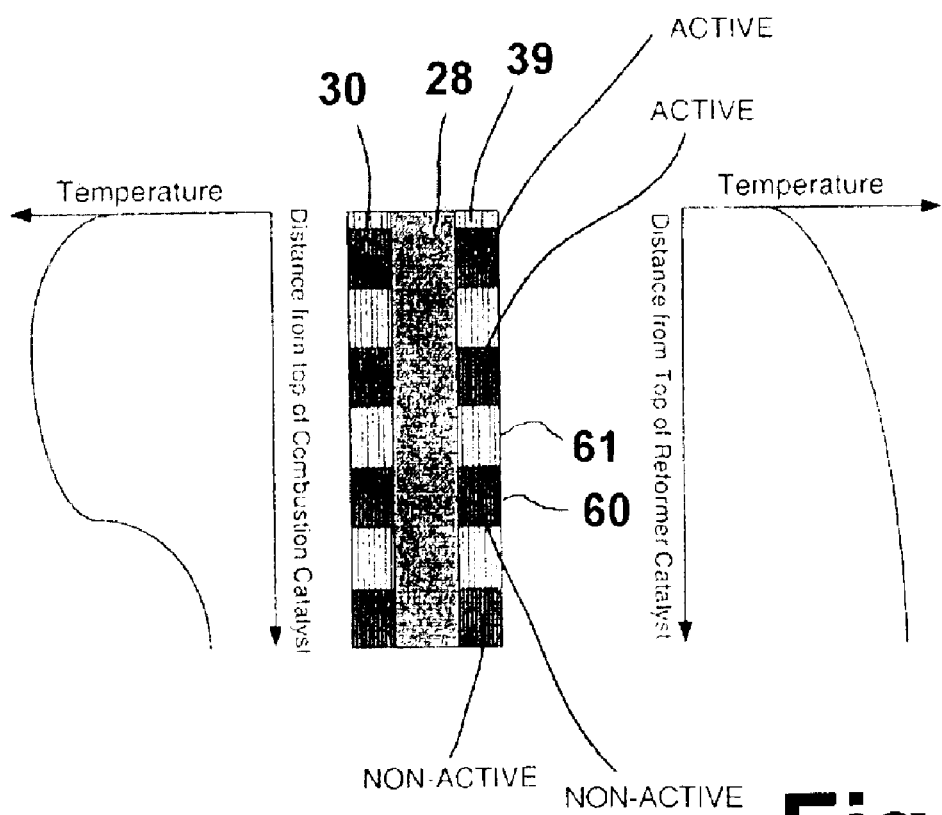

In accordance with one preferred embodiment of this invention, as shown in FIGS. 3A and 3B, combustion catalyst bed 30 comprises two or more layered sections of combustion catalyst 60 alternating with inert ceramic material 61, thereby forming stages of combustion. In accordance with one embodiment, combustion catalyst bed 30 comprises alternating layers of combustion catalyst with an inert ceramic material in the form of blank ceramic beads. By virtue of this arrangement, combustion catalyst reaction activity can be increased or decreased by appropriate control of combustion rates.

Staged combustion, in accordance with one embodiment of this invention, is employed in relation to reformer heat duty as a means for maximizing reforming reactions. This is accomplished using combustion catalyst beds comprising alternating layers of combustion catalyst and blank non-catalyzed ceramic particles. Depending on the space velocity of the reformer conditions, heat generated from combustion of the combustible fuel, which is preferably natural gas, is moved up or down the length of reformer reactor vessel 28, by adjusting combustor air and fuel velocities, so as to match reformer temperature profile requirements. During operation, the incoming fuel/air combustion mixture is heated by the counter current flow pattern of the reformer/flue gas by the outgoing reformer process gas directly from the reformer vessel. The lowest combustion catalyst region is the primary active combustor region. At low flow conditions as shown in FIG. 3A, the space velocity permits the lowest layers of combustion catalyst, labeled "active", to burn substantially all of the combustible fuel. At higher flow rates, the incoming fuel/air combustion mixture is heated by outgoing reformer process gas from the reformer reactor vessel 28. Under these higher flow rate conditions, the fuel/air mixture is not at a high enough temperature at the lower levels of combustion catalyst to reach auto-ignition. Consequently, the unburned fuel/air mixture advances to the next higher level of combustion catalyst at which a secondary light-off of fuel occurs, resulting in combustion in the range of about 30% to about 100% of the combustible fuel. As the space velocity increases further, as shown in FIG. 3B, the higher combustion catalyst region comes into contact with combustible fuel from the lower combustion catalyst region that has exceeded the maximum operational space velocity for that lower combustion catalyst region, resulting in the fuel being consumed in multiple active regions. Thus, two or more combustion catalyst regions can be active depending upon the reformer needs.

The use of multiple active combustion catalyst regions reduces the maximum temperature compared to a single active region. During operation, a single active combustor region may have temperatures exceeding 2400° F., while in a multiple active combustor region the maximum temperature is less than 1800° F. These lower temperatures reduce metal fatigue and corrosion effects, allowing less costly metals for fabrication.

The heat exchange section of the fuel processor 10 comprises steam coils 13 disposed in the flue gas end 35 of combustion chamber 39 and having a steam coil inlet 26 and a steam coil outlet 27. In accordance with one preferred embodiment of this invention, the heat exchange section further comprises methanator cooling coils 15 having a methanator cooling coil inlet 22 and a methanator cooling coil outlet 23. Methanator cooling coils 15 are located in the methanation zone 19 of shift/methanator reactor vessel 14. In accordance with another preferred embodiment of this invention, the heat exchange section further comprises shift cooling coils 16 disposed within shift zone 20 of shift/methanator reactor vessel 14 and having a shift cooling coil inlet 24, which is in fluid communication with methanator cooling coil outlet 23 of methanator cooling coils 15, and a shift cooling coil outlet 25, which is in fluid communication with steam coil inlet 26 of steam coils 13.

In accordance with one embodiment of this invention, fuel processor 10 comprises a cathode air and humidification section 45 disposed proximate flue gas outlet 43. Disposed within the cathode air and humidification section is a cathode coil 46 having a water/air inlet 48 and a humidified cathode air outlet 47.

During operation of the fuel processor 10 of this invention, a portion of the hydrocarbon feed is first desulfurized by desulfurization means (not shown). For purposes of this exemplary embodiment, natural gas is used as the hydrocarbon feed. However, in no way should this discussion be deemed as limiting the scope of this invention to the use of natural gas as the hydrocarbon feedstock. In accordance with one embodiment of this invention, the desulfurization means are disposed outside of the fuel processor while in accordance with another embodiment of this invention, the desulfurization means are disposed within the fuel processor. Any suitable means for desulfurizing, such as passing of the natural gas over a chemisorbent, may be employed.

The desulfurized natural gas is then mixed with water/steam, preferably from deionized water, forming a natural gas/water mixture, which is then passed into the heat exchange section of the fuel processor 10. In accordance with one embodiment of this invention, water is passed directly into steam coils 13, natural gas is mixed together with water and/or steam from shift cooling coil 16 and passed directly into the steam coils 13, which are heated by convection and radiation from the hot flue gas produced by the combustor to provide a preheated effluent comprising steam. The point of mixing in accordance with one embodiment of this invention is designated as reference numeral 32 in FIG. 1. In accordance with one embodiment of this invention, the water is first introduced into methanator cooling coils 15 from which it then flows into and through shift cooling coils 16 before mixing with natural gas and being passed into steam coils 13.

The preheated effluent exiting steam coils 13 through steam coil outlet 27 is then passed into reformer reactor vessel 28. In accordance with one embodiment of this invention, reformer reactor vessel 28 is comprised of a cylindrical metal housing, such as Inconel or stainless steel, in the form of a straight or corrugated tube, which is filled with reforming catalyst 29. The reformer reactor vessel 28 comprises an input end 53 for receiving the preheated effluent, which is located in the vicinity of the middle of the fuel processor 10, and an output end 54 for discharging the reformer effluent, which is located in the vicinity of the base of the fuel processor 10.

Reformer reactor vessel 28 is heated by the combustor, which is preferably a multi-fuel combustor, which is comprised of a bed of combustion catalyst 30 that surrounds the exterior of the reformer reactor vessel and fills at least a portion of the annular space between the outer wall of the reformer reactor vessel 28 and the inner wall of the cylindrically shaped vertical (flue gas) shaft at the central axis of the fuel processor 10. In accordance with one embodiment of this invention, a portion of the hydrocarbon-containing fuel is combusted at sufficiently high temperature to provide the heat required to convert the hydrocarbon fuel in the reformer reactor vessel 28 via the well-known endothermic hydrocarbon reforming reactions to a gas mixture comprising mainly hydrogen, carbon monoxide, carbon dioxide and steam. The combustor flue gas temperature gradient is adjusted to match reformer requirements by regulating the amount of air passed with the hydrocarbon-containing fuel into the fuel combustor. The energy requirements of the flue gas increases as the quantity of hydrogen required for a particular application, e.g. a fuel cell, is increased. A ceramic plate start-up burner 21 with an electric spark igniter 31 is located beneath the combustion catalyst bed 30, with view port 38 being used to confirm flame status, and is used during startup of the fuel processor 10 to combust the hydrocarbon-containing fuel to provide the heat required to bring the combustion catalyst bed 30 up to "light-off" ignition temperature, after which the hydrocarbon-containing fuel supply to the burner is cut off.

The reformer effluent, comprising hydrogen, carbon monoxide, carbon dioxide and steam is passed into the carbon monoxide reduction section of the fuel processor 10, namely shift/methanator reactor vessel 14, which is comprised of an annular cylindrical metal housing, preferably fabricated from thin wall corrugated 316 stainless steel tubing or other compatible metal, such as aluminum to reduce cost. The shift/methanator vessel 14 is embedded within the casted ceramic refractory insulation. Embedding is carried out during the fuel processor fabrication process by pouring the castable insulation around the shift/methanator reactor vessel and allowing it to cure.

Shift/methanator reactor vessel 14 comprises an input end 55 and an output end 56. The input end 55 is in fluid communication with the output end 54 of reformer reactor vessel 28 whereby the reformer effluent from reformer reactor vessel 28 is passed into shift/methanator reactor vessel 14 through a distribution plate 33. Distribution plate 33 may be a perforated plate having a specific thickness, number and size and arrangement of holes through the plate or a sintered metal plate having a specific porosity, so as to distribute process gas evenly across the area of the distribution plate. The output end 56 of reformer reactor vessel 28 through which the hydrogen product gas is passed is disposed proximate the top of fuel processor 10. Shift/methanator reactor vessel 14 is filled with both shift and methanation catalysts. Shift and methanation catalysts are positioned within the shift/methanation vessel according to the combustion chamber temperature profile, cooling coils and insulation thickness. Infrared radiation and conductive heat from the combustion chamber passing through the insulation section 51, is reduced to the operating temperature of the shift/methanation catalyst by the thickness of insulation and the length of the shift cooling coil 16 and methanation cooling coil 15. Together the parameters of reforming catalysts, combustion chamber, cooling coils, insulation, shift and methanation catalysts integrates the operation and passive process control of the fuel processor. The shift catalyst 17 is disposed in the shift zone 20 of shift/methanator reactor vessel 14 proximate the input end 55; the methanation catalyst 18 is disposed in methanation zone 19 proximate the output end 56, i.e. downstream of shift catalyst 17. Thus, the reformer effluent from reformer reactor vessel 28 first contacts the shift catalyst 17 followed by the methanation catalyst 18.

A unique aspect of this invention concerns the process for removing or substantially reducing the quantity of carbon monoxide in the reformer effluent. It involves heating the mixture of gases in a reaction zone at sufficiently low temperatures where carbon monoxide and not carbon dioxide methanation predominates while conducting the process in the presence of a methanation catalyst. Accordingly, in accordance with one preferred embodiment of this invention, the temperature of the reformer effluent exiting reformer reactor vessel 28 is in the range of about 500° F. to about 1300° F. and the temperature of the product gas exiting shift/methanation reactor vessel 14 is in the range of about 200 to about 600° F. The carbon monoxide content of the product gas exiting the fuel processor of this invention is less than about 10 ppmv (dry basis) in steady-state and transient conditions.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A method for reforming a hydrocarbon fuel comprising the steps of:

mixing said hydrocarbon fuel with water, forming a fuel/water mixture;

introducing said fuel/water mixture into a heat exchange zone of a fuel processor, said heat exchange zone comprising at least one steam vaporizing coil, said at least one steam vaporizing coil heated with products of combustion from a combustor disposed within said fuel processor, forming a preheated mixture comprising steam;

introducing said preheated mixture into an input end of a reformer section disposed within said fuel processor, said reformer section comprising a cylindrical housing having said input end and an output end, said input end disposed proximate a middle region of said fuel processor and said output end disposed proximate a bottom region of said fuel processor, and said reformer section heated by said combustor, said combustor comprising a combustion catalyst bed disposed around an exterior surface of said reformer section and filling at least a portion of an annular space disposed between said exterior surface and a cylindrical flue gas shaft disposed at a central axis of said fuel processor, thereby forming a reformer section effluent comprising hydrogen, carbon monoxide, carbon dioxide and steam;

passing said reformer section effluent into a shift/methanator reactor vessel, said shift/methanator reactor vessel comprising an annular cylindrical structure having a shift/methanator reactor inlet end in fluid communication with said output end of said reformer section and a shift/methanation reactor outlet end, said annular cylindrical structure forming an inner annular region between said annular cylindrical structure and said combustor and an outer annular region between said annular cylindrical structure and a fuel processor housing enclosing said combustor, said reformer section, said heat exchange zone and said shift/methanation reactor vessel, and said annular structure filled with a shift catalyst proximate said shift/methanator reactor inlet end and a methanation catalyst proximate said shift/methanator outlet end, forming a hydrogen-rich product gas.

2. A method in accordance with claim 1, wherein said outer annular region and said inner annular region are filled with an insulating material.

3. A method in accordance with claim 2, wherein said insulating material is one of a castable refractory and a moldable ceramic insulating foam.

4. A method in accordance with claim 1, wherein a flue gas exhausted from said fuel processor has a temperature in a range of about 300° F. to about 600° F.

5. A method in accordance with claim 1, wherein said reformer section effluent exits from said reformer section at a temperature in a range of about 500° F. to about 1300° F.

6. A method in accordance with claim 1, wherein said hydrogen-rich product gas exiting from said shift/methanator reactor vessel is in the range of about 200° F. to about 600° F.

7. An apparatus comprising:

at least one housing wall, said at least one housing wall forming a reformable fuel inlet, a product gas outlet, a combustible fuel inlet and a flue gas outlet;

a shift/methanator reactor vessel comprising at least one reactor vessel wall disposed within said housing and forming an outer annular space between said at least one reactor vessel wall and said at least one housing wall;

a combustion chamber comprising at least one combustion chamber wall and forming a first inner annular space between said at least one combustion chamber wall and said at least one reactor vessel wall, said combustion chamber having a combustion products outlet in fluid communication with said flue gas outlet; and a reformer reactor vessel comprising at least one reformer vessel wall and forming a second inner annular space between said at least one reformer vessel wall and said at least one combustion chamber wall.

8. An apparatus in accordance with claim 7 further comprising at least one combustion catalyst disposed in said second inner annular space.

9. An apparatus in accordance with claim 7, wherein at least one methanator cooling coil having a fuel/water inlet and a fuel/water outlet is disposed in a downstream region of said shift/methanator reactor vessel.

10. An apparatus in accordance with claim 9, wherein a shift cooling coil having a shift gas inlet in fluid communication with said fuel/water outlet and having a shift gas outlet is disposed in an downstream region of said shift/methanator reactor vessel.

11. An apparatus in accordance with claim 10 further comprising at least one steam coil having a pre-reformed gas inlet and a pre-reformed gas outlet disposed within said combustion chamber, said pre-reformed gas inlet in fluid communication with said shift gas outlet and said pre-reformed gas outlet in fluid communication with an interior of said reformer reactor vessel.

12. An apparatus in accordance with claim 11, wherein said at least one reformer vessel wall forms a reformed gas outlet, said reformed gas outlet in fluid communication with an interior of said shift/methanator reactor vessel.

13. An apparatus in accordance with claim 7, wherein said at least one reformer vessel wall forms a reformed gas outlet, said reformed gas outlet in fluid communication with an interior of said shift/methanator reactor vessel.

14. An apparatus in accordance with claim 7, wherein said shift/methanator reactor vessel comprises a shift region in which is disposed at least one shift catalyst and a methanation region in which is disposed at least one methanation catalyst, said shift catalyst disposed upstream of said methanation catalyst.

15. An apparatus in accordance with claim 7, wherein one of a castable refractory and a moldable ceramic insulating foam is disposed in said outer annular space and said first inner annular space.

16. An apparatus in accordance with claim 7, wherein at least one reformer catalyst is disposed within said reformer reactor vessel.

17. An apparatus in accordance with claim 7, wherein said housing is cylindrical in shape.

18. An apparatus in accordance with claim 17, wherein said shift/methanator reactor vessel is cylindrical in shape and coaxially aligned with said housing.

19. An apparatus in accordance with claim 18, wherein said reformer reactor vessel is cylindrical in shape and coaxially aligned with said housing.

20. An apparatus in accordance with claim 7 further comprising a ceramic start-up burner adapted to fire into said combustion chamber.

21. An apparatus in accordance with claim 7 further comprising an air humidification section disposed within said apparatus proximate said flue gas outlet.

22. An apparatus comprising:
a cylindrical fuel processor housing having a reformable fuel inlet, a product gas outlet, a combustible fuel inlet and a flue gas outlet;
a cylindrical annular shift/methanator reactor vessel having a reformed fuel inlet end corresponding to a shift zone, a product gas outlet end corresponding to a methanation zone and an inner cylindrical wall and an outer cylindrical wall concentrically disposed within said cylindrical fuel processor housing and forming an annular region between said cylindrical fuel processor housing and said outer cylindrical wall, said inner cylindrical wall enclosing a concentrically disposed core region;
a combustion chamber wall enclosing a cylindrical combustion chamber concentrically disposed within said concentrically disposed core region and forming an outer annular region between said inner cylindrical wall and said combustion chamber wall, said cylindrical combustion chamber having a combustion end and an exhaust end, said combustion end oriented toward said reformed fuel inlet end of said shift/methanator reactor vessel;
a cylindrical reformer vessel concentrically disposed within said cylindrical combustion chamber and forming an inner annular region between an outer surface of said reformer vessel and said combustion chamber wall, said cylindrical reformer vessel having a reformed fuel outlet end oriented toward said reformed fuel inlet end in fluid communication with said reformed fuel inlet end and a reformable fuel inlet end in fluid communication with said reformable fuel inlet of said housing;
a shift catalyst disposed in said shift zone of said shift/methanator reactor vessel and a methanation catalyst disposed in said methanation zone of said shift/methanator reactor vessel;
a reformer catalyst disposed in said cylindrical reformer vessel; and
heat exchange means disposed within said housing for controlling the temperature of a process stream passing through said apparatus.

23. An apparatus in accordance with claim 22, wherein a combustion catalyst bed is disposed in said inner annular region.

24. An apparatus in accordance with claim 22, wherein said heat exchange means comprises a steam coil disposed in said combustion chamber proximate said exhaust end, said steam coil having a steam coil inlet end and a steam coil outlet end, said steam coil outlet end in fluid communication with said reformable fuel inlet end of said cylindrical reformer vessel.

25. An apparatus in accordance with claim 24, wherein said heat exchange means further comprises a methanator cooling coil disposed in said methanation zone of said shift/methanator reactor vessel and having a methanator cooling coil inlet end and a methanator cooling coil outlet end, said methanator cooling coil outlet end in fluid communication with said steam coil inlet end.

26. An apparatus in accordance with claim 25, wherein said heat exchange means further comprises a shift cooling coil disposed between said steam coil and said methanation cooling coil in said shift zone of said shift/methanator reactor vessel and having a shift cooling coil inlet end and a shift cooling coil outlet end, said shift cooling coil inlet end in fluid communication with said methanation cooling coil outlet end and said shift cooling coil outlet end in fluid communication with said steam coil inlet end.

27. An apparatus in accordance with claim 22 further comprising a ceramic start-up burner adapted to burn a fuel in said combustion end of said combustion chamber.

28. An apparatus in accordance with claim 22, wherein said reformer catalyst comprises a plurality of alternating layers of larger and smaller particles.

29. An apparatus in accordance with claim 22 further comprising an air humidification section disposed within said cylindrical fuel processor housing proximate said flue gas outlet.

* * * * *